United States Patent [19]
Kawano

[11] 3,911,768
[45] Oct. 14, 1975

[54] CORE CUTTING APPARATUS

[75] Inventor: Mak S. Kawano, Wheaton, Ill.

[73] Assignee: American Tara Corporation, Chicago, Ill.

[22] Filed: Aug. 16, 1974

[21] Appl. No.: 498,233

[52] U.S. Cl. ............................ 82/86; 82/91; 82/101
[51] Int. Cl.² ........................ B23B 3/04; B23B 5/14
[58] Field of Search ......... 82/46, 48, 59, 70.1, 70.2, 82/71, 72, 79, 80, 83, 84, 86, 87, 91, 92, 96, 100, 101

[56] References Cited
UNITED STATES PATENTS

| | | | |
|---|---|---|---|
| 898,732 | 9/1908 | Fishering | 82/100 |
| 969,858 | 9/1910 | Hamilton | 82/87 |
| 2,521,003 | 9/1950 | Gitter | 82/100 |
| 3,143,014 | 8/1964 | Blake | 82/91 |
| 3,344,696 | 10/1967 | Harvey | 82/101 |

Primary Examiner—Harrison L. Hinson
Attorney, Agent, or Firm—Barry L. Clark

[57] ABSTRACT

Improved apparatus for cutting an elongated paper tube or core mounted on a mandrel into a plurality of identical length core segments has a single control lever which when pivotally moved, actuates a cam and through a linkage system expands a portion of the mandrel against the core. A push button on the control lever electrically controls the rotation of the mandrel while continued pivotal movement of the lever moves a circular cutter into the tube to be cut. An adjustable stop member which is articulated to permit the loading of new cores pivots with the control lever to permit core segments to fall away from the mandrel as they are severed from the tube. A polyurethane ring on the mandrel provides a long lasting anvil surface for the cutter.

14 Claims, 7 Drawing Figures

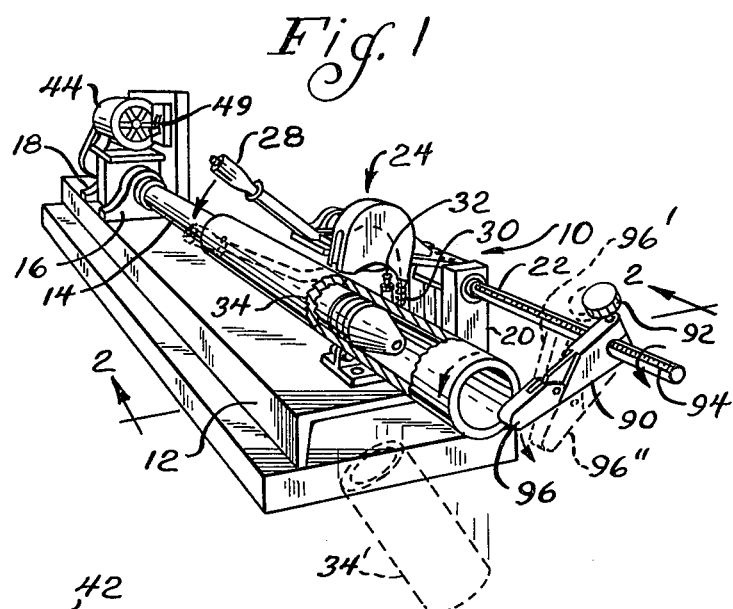
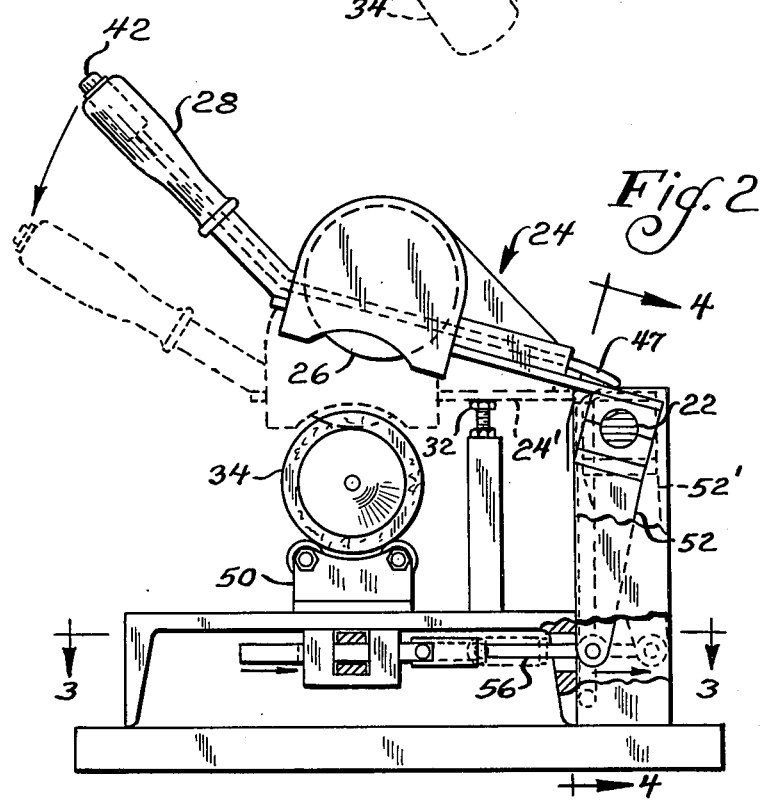
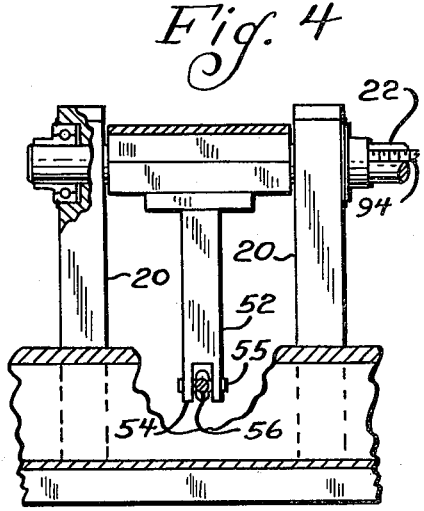
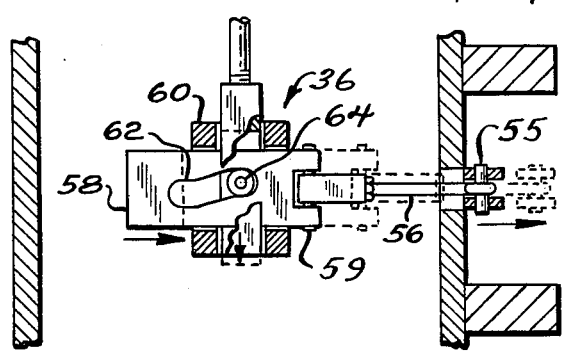

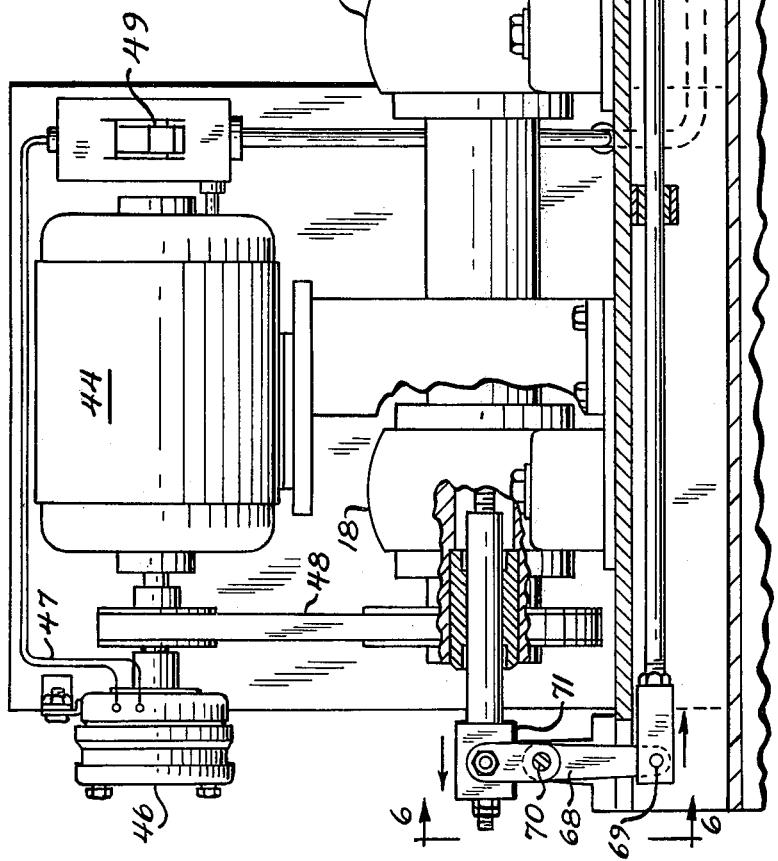
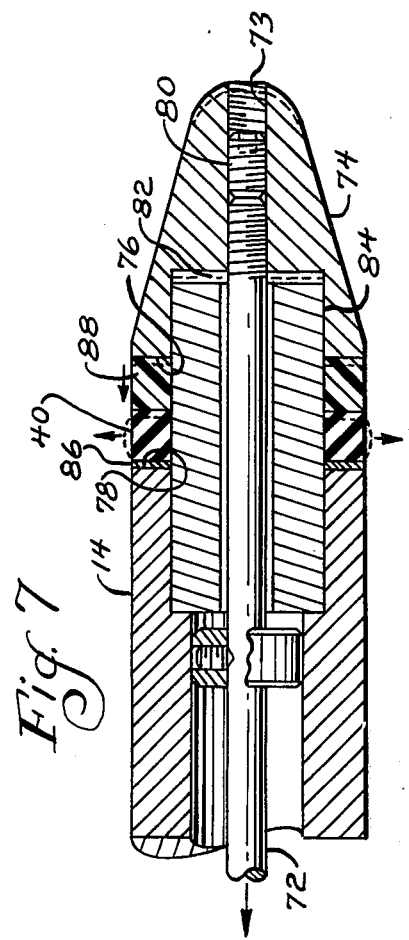
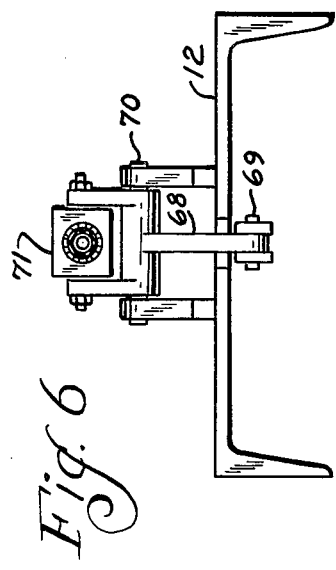

CORE CUTTING APPARATUS

BACKGROUND OF THE INVENTION

In the manufacture of one time carbon paper as well as many other web type products the web is wound on an annular core member which is usually made of many layers of paper. A product like roll carbon paper is usually offered in a wide range of widths depending upon the size of business forms being made with it. Rather than order or stock many sizes of cores, it is the usual practice to purchase paper cores in relatively long lengths, such as four feet, and then cut them to the desired size. Since the paper web, but not the cores, can be easily slit to width while it is being wound, a plurality of cores of a desired width are placed on the winding mandrel of the paper winding machine. By slitting a wide web as it is wound, it is possible to produce several narrow rolls of paper from one wide roll. Obviously, it is important that the device which cuts the cores to size be capable of producing cores of an exact length if the plurality of side by side cores on the mandrel of the winding machine are to correspond to the edge locations of each roll of paper being formed as determined by the slitting knives.

Although core cutters are known which have separate levers for moving the cutter toward the core and for locking the mandrel to the core it is highly desirable that an operator have as few operations to perform as possible so that he can accurately and quickly advance the core into position for cutting, cause the mandrel to rotate only as necessary for cutting, make the cut and remove the cut-off core segment as quickly as possible, and load new cores on the mandrel.

It is among the objects of this invention to provide an apparatus which permits an operator to perform all of the aforementioned functions very quickly and with a minimum of effort.

SUMMARY

The improved core cutter of the invention consists basically of a selectively rotatable mandrel having locking means for engaging and anchoring a core for rotation with it and a pivoted arm carrying a freely rotatable cutter disc. A manually operable handle extending from the pivoted arm includes a push button in its outer end which permits the operator to actuate an electric clutch for causing the mandrel to rotate. A cam and a linkage assembly actuated by the initial movement of the pivoted cutter carrying arm toward the mandrel compresses a rubber ring near the tip of the mandrel in an axial direction and causes the rubber to expand radially into locking contact with a core member positioned on the mandrel. As the cutter disc contacts the rotating core it is rotated by frictional contact with the core. A polyurethane ring on the mandrel provides a very durable anvil for the cutter disc which assures a clean cut-off of the core segment without dulling the cutter disc. By combining a spacer element with the polyurethane ring it is possible to utilize different axial portions of the ring as an anvil means. Other features of the improved apparatus are a built in adjustable length stop member which pivots out of the way during the final portion of a cut to permit the cut-off segment to fall away from the mandrel, and a built in measuring scale which assists in adjusting the stop member. The stop member is also articulated so that a new core can be loaded onto the mandrel without changing the adjustment of the stop member.

BRIEF DESCRIPTION OF THE DRAWINGS

FIG. 1 is a perspective view of the improved core cutter showing its position before cutting in solid lines and its position after cutting in dotted lines;

FIG. 2 is an end view taken on the line 2—2 of FIG. 1;

FIG. 3 is a top sectional view taken on the line 3—3 of FIG. 2;

FIG. 4 is a view taken on line 4—4 of FIG. 2;

FIG. 5 is a partially broken away front elevational view with portions shown in section for clarity;

FIG. 6 is an end view taken on line 6—6 of FIG. 5; and

FIG. 7 is an axial sectional view of the tip of the mandrel.

DESCRIPTION OF THE PREFERRED EMBODIMENT

Referring to FIG. 1, the improved core cutter indicated generally at 10 includes a base 12 upon which a mandrel 14 is mounted by means of a pair of bearings 16,18. Since the mandrel 14 is only supported at its left end, it is preferably constructed of heavy walled steel pipe for rigidity. At the right end of the base 12 a pair of vertical supports 20 carry a pivot shaft 22 upon which a cutter arm indicated generally at 24 is mounted. The cutter arm 24 has a freely rotatable cutter disc 26 mounted on it and is pivotally movable by manual force applied to handle 28 against the force of spring 30 between its unactuated position shown in full lines (FIG. 2) and its actuated position shown in dotted lines at 24' where it is stopped by adjustable stop member 32. As the handle 28 and arm 24 are initially moved downwardly by the operator so that the cutter disc 26 approaches the fiber core member 34, a locking mechanism indicated generally at 36, which will hereinafter be described in detail, is automatically actuated. The locking mechanism 36 compresses a rubber ring 40 axially (FIG. 7) so as to force it to move radially outwardly into tight frictional engagement with the inside of core member 34. The core member 34 will thus be forced to rotate with the mandrel 14 when a push button switch 42 is depressed by the operator just before the cutter disc 26 contacts the core 34. The switch 42 is a momentary contact switch which controls an electric clutch 46 through electric lead wires 47 to transmit the rotation of motor 44 to the mandrel 14 through a V-belt 48 and appropriate pulleys. The motor 44 is preferably operated continuously and is controlled by switch 49. Once the cutter 26 engages the core 34, continued downward pressure on handle 28 will cause the cutter to sever the right end 34' of the core which is then free to fall away as shown in FIG. 1. A roller support member 50 is preferably used below the mandrel 14 to transmit the downward load applied during cutting to the base 12.

The locking mechanism 36 includes the arm 24 which pivots counterclockwise as shown in FIG. 2 to move lever 52 about shaft 22 to the dotted line position 52'. This movement causes the bifurcated end portion 54 of the lever 52 and pin 55 to pull adjustable length shaft 56 to the right. A slotted cam plate 58 which is pin connected to shaft 56 at 59 is also pulled to the right by shaft 56. Since the cam plate 58 is restrained against axial movement relative to the mandrel 14 by a guide member 60 mounted to the base 12, the angled cam slot 62 in cam plate 58 will force cam pin 64 and the elongated rod member 66 to which it is attached, axially in the direction of the arrow. Looking at FIG. 5, it can be seen that movement of the rod 66 toward the right will pivot lever member 68 through connecting pin 69 about pivot point 70 carried by base 12. The lever member 68 is pivoted to bearing member 71 so that the counterclockwise movement of lever member 68 (FIG. 5) will pull mandrel rod 72 and the mandrel tip 74 threaded to it by threads 73 to the left. A shoulder surface 76 on mandrel tip 74 is moved by the leftward movement of mandrel rod 72 toward the end face 78 of the mandrel 14 so as to compress the rubber core locking ring 40 and force it radially outwardly to its dotted line position as previously described. A set screw 80 is threaded into the end of mandrel tip 74 and against the end of mandrel rod 72 to apply a force to the threads 73 and prevent unthreading of the mandrel tip 74 during operation. The space 82 between mandrel tip 74 and a guide bushing 84 mounted in the end of mandrel 14 is sufficient to accomodate the axial compression of the rubber ring 40.

The rubber ring 40 is positioned between a spacer washer 86 and a very dense polyurethane ring 88 which forms the anvil surface for cutter disc 26. Although the polyurethane ring 88 holds up very well for many hours of use despite its being cut into by the cutter 26, the mere movement of spacer 86 to the right of the ring 88 (FIG. 7) or the reversal of the polyurethane ring 88 can double the life of the ring 88 by presenting a new cutting surface.

An important feature of the invention not yet discussed is the stop member 90 which can be adjusted by screw knob 92 to any desired position on pivot shaft 22. A measuring scale 94 recessed in shaft 22 permits the stop member 90 to be very accurately positioned relative to the cutter disc 26 so that cores of any desired length can be cut with a minimum of set-up time and waste. An articulated tip portion 96 on the stop member 90 can be pivoted upwardly as shown in dotted lines at 96' in FIG. 1 when a new core 34 is being loaded onto the mandrel 14. After loading, the tip is pivoted to its solid line position. When a core is to be cut, it is pushed to the right against the tip 96, the handle 28 is then brought down to lock the core to the mandrel and the switch 42 is depressed to rotate the mandrel and core. Continued movement of the handle 28 until the stop member 32 is engaged will cause the cutter disc 26 to move through the core and slightly into the polyurethane anvil ring 88, thereby severing the core segment 34'. The core segment 34' is free to fall off the end of the mandrel tip 74 since the tip 96 of the stop member 90 will now have been pivoted downwardly to the dotted line position 96" where it is out of contact with the core 34.

I claim:

1. Apparatus for cutting off predetermined lengths of an elongated core member comprising a mandrel, drive means to rotate the mandrel, radially movable locking means on the mandrel selectively engageable with the inner surface of a core to permit the core to rotate with the mandrel, a rotatable disc-shaped cutter, pivoted cutter support means for moving the cutter into contacting relation with the external surface of a core mounted on the mandrel, manually operated means positioned on said pivoted cutter support means for selectively actuating said drive means independently of the movement of the pivoted cutter support means, axially movable means in said mandrel for moving said locking means radially outwardly, and linkage means connected to said pivoted cutter support means for engaging and moving said axially movable means, said linkage means causing said locking means to engage a core mounted on said mandrel ans said pivoted cutter support means is actuated to move said cutter into contacting relation with the core.

2. The apparatus of claim 1 wherein said radially movable locking means comprises a resilient ring member which expands radially when compressed axially.

3. The apparatus of claim 2 wherein said cutter support means comprises a manually pivoted lever on which said cutter is mounted for rotation.

4. The apparatus of claim 1 wherein an anvil member having a cutter contacting surface is positioned on said mandrel so as to be contacted by said cutter as it severs a core.

5. The apparatus of claim 4 wherein said anvil member is resilient but much less resilient than said resilient ring member.

6. The apparatus of claim 5 wherein said anvil member is polyurethane.

7. The apparatus of claim 3 wherein said means for selectively actuating said drive means includes a switch positioned on said manually pivoted lever.

8. The apparatus of claim 3 wherein said linkage means includes cam means for converting pivotal movement of said manually pivoted lever to axial movement of a mandrel rod within said mandrel which operates said locking means.

9. The apparatus of claim 4 wherein a spacer member is positioned axially adjacent said anvil member and cooperates with said anvil member to permit a plurality of axially spaced portions of said anvil member to be engaged by said cutter to accommodate wear.

10. The apparatus of claim 3 wherein a shaft located parallel to said mandrel carries a movable, lockable stop member which is adapted to be engaged by a core located on said mandrel, said shaft and stop member being pivotally moved by said manually pivoted lever so that said stop member is free of engagement with a core on said mandrel at the completion of a cut.

11. The apparatus of claim 1 wherein a roller support member is positioned under said mandrel and a core mounted on said mandrel so as to resist cutting forces applied by said cutter and thereby minimize bending of said mandrel during a cutting operation.

12. Apparatus for cutting off predetermined lengths of an elongated core member comprising a mandrel, drive means to rotate the mandrel, radially movable locking means on the mandrel selectively engageable with the inner surface of a core to permit the core to rotate with the mandrel, a rotatable discshaped cutter, cutter support means for moving the cutter into contacting relation with the external surface of a core mounted on the mandrel, means for selectively actuating said drive means, axially movable means in said mandrel for moving said locking means radially outwardly, and linkage means connected to said cutter support means for engaging and moving said axially movable means, said linkage means causing said locking means to engage a core mounted on said mandrel as said cutter support means is actuated to move said cutter into contacting relation with the core, and a shaft located parallel to said mandrel carrying a movable, lockable stop member which is adapted to be engaged by a core located on said mandrel, said shaft and stop member being pivotally moved by the movement of said cutter support means so that said stop member is free of engagement with a core on said mandrel at the completion of a cut.

13. The apparatus of claim 12 wherein a measuring scale is mounted on said shaft, said measuring scale cooperating with an edge of said movable stop member to facilitate the locking of said stop member at any desired position spaced from said cutter.

14. The apparatus of claim 12 wherein said stop member has an articulated end portion which can be moved to permit loading of a core on said mandrel without interference.

* * * * *